US012116732B2

(12) United States Patent
Langford et al.

(10) Patent No.: US 12,116,732 B2
(45) Date of Patent: Oct. 15, 2024

(54) PAPER PRODUCTS INCORPORATING SURFACE ENHANCED PULP FIBERS AND HAVING DECOUPLED WET AND DRY STRENGTHS AND METHODS OF MAKING THE SAME

(71) Applicant: Domtar Paper Company, LLC, Fort Mill, SC (US)

(72) Inventors: Bradley Langford, Fort Mill, SC (US); David Lloyd, Fort Mill, SC (US); Brian Ranson, Fort Mill, SC (US); Gwen Johnston, Fort Mill, SC (US); Dale Kavalew, Fort Mill, SC (US)

(73) Assignee: Domtar Paper Company, LLC, Fort Mill, SC (US)

( * ) Notice: Subject to any disclaimer, the term of this patent is extended or adjusted under 35 U.S.C. 154(b) by 193 days.

(21) Appl. No.: 17/754,082

(22) PCT Filed: Sep. 23, 2020

(86) PCT No.: PCT/US2020/052179
§ 371 (c)(1),
(2) Date: Mar. 23, 2022

(87) PCT Pub. No.: WO2021/061747
PCT Pub. Date: Apr. 1, 2021

(65) Prior Publication Data

US 2022/0333314 A1 Oct. 20, 2022

Related U.S. Application Data

(60) Provisional application No. 62/904,413, filed on Sep. 23, 2019.

(51) Int. Cl.
*D21H 27/40* (2006.01)
*B31F 1/07* (2006.01)
(Continued)

(52) U.S. Cl.
CPC ............... *D21H 27/40* (2013.01); *D21D 1/34* (2013.01); *D21H 11/02* (2013.01); *D21H 17/26* (2013.01);
(Continued)

(58) Field of Classification Search
CPC .... D21H 27/007; D21H 27/38; D21H 27/005; D21H 27/40; D21H 11/02; D21H 17/26;
(Continued)

(56) References Cited

U.S. PATENT DOCUMENTS 3,098,785 A 7/1963 Meiler
3,388,037 A 6/1968 Asplund et al.
(Continued)

FOREIGN PATENT DOCUMENTS

AU 2015218812 B2 4/2017
AU 2013305802 B2 5/2017
(Continued)

OTHER PUBLICATIONS

Korean Notice of Preliminary Rejection in related Korean Patent Application No. KR10-2023-7022380 dated Aug. 21, 2023 with English Translation.
(Continued)

*Primary Examiner* — Jose A Fortuna
(74) *Attorney, Agent, or Firm* — Troutman Pepper Hamilton Sanders LLP; Alison L. McCarthy; Celeste K. Walker

(57) ABSTRACT

A method of making a paper product can comprise making one or more sheets at least by, for each of the sheet(s), forming a web from one or more furnishes that comprise fibers dispersed in water. The fibers of the furnish(es) can comprise a plurality of first fibers that are hardwood fibers and a plurality of second fibers that include softwood fibers and surface enhanced pulp fibers (SEPF), the SEPF having
(Continued)

a length weighted average fiber length of at least 0.20 mm. The method can comprise at least partially dewatering the web to form the sheet. The sheet(s) can be laminated and/or embossed such that a total dry tensile strength of the paper product is less than or equal to 90% of the sum of the total dry tensile strength(s) of the sheet(s).

12 Claims, 5 Drawing Sheets

(51) Int. Cl.

| | |
|---|---|
| ***D21D 1/34*** | (2006.01) |
| ***D21H 11/02*** | (2006.01) |
| ***D21H 17/26*** | (2006.01) |
| ***D21H 17/55*** | (2006.01) |
| ***D21H 21/20*** | (2006.01) |
| ***D21H 27/02*** | (2006.01) |

(52) U.S. Cl.
CPC ............. *D21H 17/55* (2013.01); *D21H 21/20* (2013.01); *D21H 27/02* (2013.01); *B31F 1/07* (2013.01)

(58) Field of Classification Search
CPC ........ D21H 17/55; D21H 21/20; D21H 27/02; D21H 15/02; D21H 17/71; D21H 25/005; D21H 27/30; D21H 11/18; D21D 1/20; D21D 1/34; D21C 9/007; D21F 11/14; B31F 1/07
See application file for complete search history.

(56) References Cited

U.S. PATENT DOCUMENTS 3,519,211 A 7/1970 Marsan et al.
3,708,130 A 1/1973 Perry
3,794,558 A 2/1974 Back
3,873,412 A 3/1975 Charters et al.
3,891,499 A 6/1975 Kato et al.
3,920,508 A 11/1975 Yonemori
3,966,543 A 6/1976 Cayle et al.
4,012,279 A 3/1977 Selander et al.
4,054,625 A 10/1977 Kozlowski et al.
4,247,362 A 1/1981 Williams
4,337,116 A 6/1982 Foster et al.
4,635,864 A 1/1987 Peterson et al.
4,895,019 A 1/1990 Lehmikangas et al.
4,925,530 A 5/1990 Sinclair et al.
5,110,412 A 5/1992 Fuentes et al.
5,248,099 A 9/1993 Lahner et al.
5,308,449 A 5/1994 Fuentes et al.
5,695,136 A 12/1997 Rohden et al.
5,731,080 A 3/1998 Cousin et al.
5,824,364 A 10/1998 Cousin et al.
5,954,283 A * 9/1999 Matthew ................... B02C 7/12 241/298
6,156,118 A 12/2000 Silenius
6,165,317 A 12/2000 Sabourin
6,251,222 B1 6/2001 Silenius et al.
6,296,736 B1 10/2001 Hsu et al.
6,348,127 B1 2/2002 Gallagher et al.
6,375,974 B1 4/2002 Ito et al.
6,537,680 B1 3/2003 Norlander et al.
6,599,391 B2 7/2003 Silenius et al.
6,773,552 B1 8/2004 Albert et al.
6,861,380 B2 3/2005 Garnier et al.
6,887,350 B2 * 5/2005 Garnier .................. D21H 13/10 162/146
6,935,589 B1 * 8/2005 Matthew ................ D21D 1/306 241/261.3
6,946,058 B2 9/2005 Hu
6,955,309 B2 10/2005 Matthew et al.
7,381,294 B2 6/2008 Suzuki et al.
7,624,879 B2 12/2009 Frances
7,741,234 B2 6/2010 Smith et al.
7,942,964 B2 5/2011 Luo et al.
8,419,899 B2 4/2013 Xia et al.
8,871,057 B2 10/2014 Gane et al.
9,297,112 B2 3/2016 Mesic et al.
9,816,233 B2 11/2017 Shi et al.
9,879,361 B2 1/2018 Pande et al.
9,920,484 B2 * 3/2018 Marcoccia ............. D21H 15/02
9,988,762 B2 * 6/2018 Bilodeau ................ D21D 1/306
10,563,356 B2 2/2020 Marcoccia et al.
10,704,165 B2 7/2020 Pande et al.
10,710,930 B2 7/2020 Marcoccia et al.
10,975,499 B2 * 4/2021 Pande ....................... D01B 9/00
11,441,271 B2 * 9/2022 Pande .................. D21H 27/002
11,473,245 B2 * 10/2022 Marcoccia ............. D21H 15/02
11,499,269 B2 11/2022 Pande et al.
11,608,596 B2 * 3/2023 Pande .................... D21H 23/56
2002/0011317 A1 1/2002 Lee
2002/0059886 A1 5/2002 Merkley et al.
2002/0069791 A1 6/2002 Merkley et al.
2002/0084046 A1 7/2002 Hsu et al.
2003/0111197 A1 6/2003 Hu
2004/0065419 A1 4/2004 Lasmarias et al.
2004/0112558 A1 6/2004 Garnier et al.
2004/0112997 A1 6/2004 Matthew et al.
2004/0149403 A1 8/2004 Rheims et al.
2004/0180184 A1 9/2004 Fillion et al.
2004/0241350 A1 12/2004 Koga et al.
2005/0145348 A1 7/2005 Lee
2005/0194477 A1 9/2005 Suzuki
2006/0006264 A1 1/2006 Sabourin et al.
2007/0164143 A1 7/2007 Sabourin et al.
2008/0148999 A1 6/2008 Luo et al.
2008/0227161 A1 9/2008 Levie et al.
2009/0145562 A1 6/2009 Nguyen
2009/0145842 A1 6/2009 Frances
2009/0162602 A1 6/2009 Cottier et al.
2009/0221812 A1 9/2009 Ankerfors et al.
2009/0266500 A1 10/2009 Schubert et al.
2010/0065236 A1 3/2010 Henriksson et al.
2010/0218908 A1 9/2010 Silenius et al.
2010/0288456 A1 11/2010 Westland et al.
2011/0088858 A1 * 4/2011 Polat ...................... D21C 5/005 162/91
2011/0277947 A1 11/2011 Hua et al.
2011/0314726 A1 12/2011 Jameel et al.
2012/0007363 A1 1/2012 Wang
2012/0012031 A1 1/2012 Husband et al.
2012/0241114 A1 9/2012 Axrup et al.
2012/0277710 A1 11/2012 Marinelli et al.
2013/0071655 A1 3/2013 Zwick et al.
2013/0202870 A1 8/2013 Malmborg et al.
2013/0209749 A1 8/2013 Myangiro et al.
2013/0248130 A1 9/2013 Stockhaus
2014/0057105 A1 * 2/2014 Pande ....................... D02J 3/02 428/401
2014/0116635 A1 5/2014 Porto et al.
2014/0180184 A1 6/2014 Duguid
2014/0209260 A1 7/2014 Li et al.
2014/0209264 A1 7/2014 Tirimacco et al.
2014/0302117 A1 10/2014 Moen et al.
2015/0299955 A1 10/2015 Laukkanen et al.
2016/0069029 A1 3/2016 Shannon
2016/0138224 A1 5/2016 Shannon et al.
2016/0333524 A1 11/2016 Pande et al.
2016/0340802 A1 11/2016 Pande et al.
2017/0058457 A1 * 3/2017 Marcoccia ............. D21H 11/16
2017/0073893 A1 3/2017 Bilodeau et al.
2017/0217654 A1 8/2017 Harmon
2017/0226009 A1 8/2017 Marcoccia et al.
2017/0370036 A1 12/2017 Hermans et al.
2018/0105986 A1 4/2018 Pande et al.
2018/0148895 A1 5/2018 Marcoccia et al.
2019/0218716 A1 7/2019 Hoglund et al.
2019/0242062 A1 * 8/2019 Harshad ................. D21H 15/02
2020/0063353 A1 2/2020 Everett et al.
2020/0308769 A1 10/2020 Pande et al.

(56) References Cited

U.S. PATENT DOCUMENTS

| | | | | |
|---|---|---|---|---|
| 2020/0325629 | A1 | 10/2020 | Marcoccia et al. | |
| 2020/0340155 | A1* | 10/2020 | Pande | D21H 13/00 |
| 2021/0207289 | A1* | 7/2021 | Pande | D21D 1/06 |
| 2022/0333312 | A1* | 10/2022 | Langford | D21F 11/14 |
| 2022/0333314 | A1* | 10/2022 | Langford | D21H 17/71 |
| 2022/0356648 | A1* | 11/2022 | Pande | D21D 99/00 |
| 2023/0035105 | A1* | 2/2023 | Marcoccia | D21H 23/28 |
| 2023/0084180 | A1 | 3/2023 | Pande et al. | |
| 2023/0250588 | A1* | 8/2023 | Pande | D21C 5/02 162/149 |
| 2023/0366155 | A1* | 11/2023 | Zwick | D21H 27/38 |

FOREIGN PATENT DOCUMENTS

| | | | | |
|---|---|---|---|---|
| CA | 2883161 | A1 | 2/2014 | |
| CA | 3150203 | A1 * | 4/2021 | D21C 9/007 |
| CN | 1516768 | A | 7/2004 | |
| CN | 1718914 | A | 1/2006 | |
| CN | 101691700 | A | 4/2010 | |
| CN | 102971462 | A | 3/2013 | |
| CN | 103590283 | B | 12/2015 | |
| CN | 108867181 | A | 11/2018 | |
| CN | 111788057 | B * | 5/2022 | B29C 43/003 |
| EP | 0333209 | A2 | 9/1989 | |
| EP | 0333212 | A2 | 9/1989 | |
| EP | 1232854 | A1 * | 8/2002 | B31F 1/07 |
| EP | 2191066 | A1 | 6/2010 | |
| EP | 2220291 | A1 | 8/2010 | |
| EP | 2888401 | B1 * | 1/2018 | D01B 9/00 |
| EP | 3108059 | B1 * | 8/2019 | D21C 9/007 |
| FR | 2520769 | A1 | 8/1983 | |
| JP | S58136895 | A | 8/1983 | |
| JP | H02229747 | A | 9/1990 | |
| JP | H03122038 | A | 5/1991 | |
| JP | H04194097 | A | 7/1992 | |
| JP | H04263699 | A | 9/1992 | |
| JP | H07165456 | A | 6/1995 | |
| JP | H08197836 | A | 8/1996 | |
| JP | H08284090 | A | 10/1996 | |
| JP | H09124950 | A | 5/1997 | |
| JP | 2002194691 | A | 7/2002 | |
| JP | 2004525284 | A | 8/2004 | |
| JP | 2004360088 | A | 12/2004 | |
| JP | 2007231438 | A | 9/2007 | |
| JP | 2010125694 | A | 6/2010 | |
| JP | 2012526923 | A | 11/2012 | |
| JP | 2015526608 | A | 9/2015 | |
| JP | 2018135631 | A | 8/2018 | |
| KR | 20040022874 | A | 3/2004 | |
| KR | 10-20050086850 | A | 8/2005 | |
| KR | 100662043 | B1 | 12/2006 | |
| KR | 10-2010-0090745 | A | 8/2010 | |
| KR | 10-20130132381 | A | 12/2013 | |
| RU | 2224060 | C2 | 2/2004 | |
| RU | 2309211 | C2 | 10/2007 | |
| RU | 2358055 | C2 | 6/2009 | |
| WO | 1996004424 | A1 | 2/1996 | |
| WO | 1998023814 | A1 | 6/1998 | |
| WO | 2002014606 | A2 | 2/2002 | |
| WO | 2002095129 | A1 | 11/2002 | |
| WO | 2004101889 | A2 | 11/2004 | |
| WO | 2009014483 | A1 | 1/2009 | |
| WO | 2009038730 | A1 | 3/2009 | |
| WO | 2009155541 | A2 | 12/2009 | |
| WO | 2010134868 | A1 | 11/2010 | |
| WO | 2012007363 | A1 | 1/2012 | |
| WO | 2012101331 | A1 | 8/2012 | |
| WO | 2014031737 | A1 | 2/2014 | |
| WO | 2014106684 | A1 | 7/2014 | |
| WO | 2015127233 | A1 | 8/2015 | |
| WO | 2015127239 | A1 | 8/2015 | |
| WO | WO-2017196519 | A1 * | 11/2017 | A47K 10/16 |
| WO | 2018026804 | A1 | 2/2018 | |
| WO | 2018051275 | A2 | 3/2018 | |
| WO | 2019152969 | A1 | 8/2019 | |
| WO | WO-2021061723 | A1 * | 4/2021 | D21C 9/007 |
| WO | WO-2021061747 | A1 * | 4/2021 | D21D 1/34 |

OTHER PUBLICATIONS

International Search Report and Written Opinion from corresponding International Application No. PCT/US2020/52179 dated Jan. 29, 2021, International Filing Date Sep. 23, 2020.

Applicant Initiated Interview Summary for U.S. Appl. No. 13/836,760, dated May 9, 2017.

Applicant Initiated Interview Summary for U.S. Appl. No. 13/836,760, dated Sep. 27, 2017.

Brazilian Notice of Rejection in corresponding Brazilian Patent Application No. 1120150038190 dated May 24, 2022 with English summary.

Brazilian Search Report issued in Corresponding Brazilian Patent Application No. BR112015003819-0, dated Sep. 9, 2019.

Carvalho, et al., "A Comparative Study for Two Automated Techniques for Measuring Fiber length," Tappi Journal, Technical Association of The Pulp & Paper Industry, 80(2): 137-142, 1997.

Declaration of Harshad Pande and Bruno Marcoccia, filed in U.S. Appl. No. 13/836,760, dated Oct. 12, 2016.

Demuner et al., "Ultra Low Intensity Refining of Eucalyptus Pulps." Scientific and Technical Advances in Refining and Mechanical Pulping 2005.

Extended European Search Report issued in European Application No. 17195921.6, mailed Nov. 20, 2017.

Final Office Action issued in U.S. Appl. No. 13/836,760, dated May 12, 2016.

Final Office Action issued in U.S. Appl. No. 13/838,760, dated Jan. 27, 2017.

Handbook of Pulping and Papermaking, C. Biermann, Academic Press; 2nd Edition (Aug. 5, 1996), p. 145.

Intention to grant for European Patent Application No. 13759601.1, dated Jul. 25, 2017, 45 pgs.

International Preliminary Report on Patentability for PCT Application No. PCT/US2013/055971, dated Feb. 24, 2015.

International Preliminary Report on Patentability issued in International Patent Application No. PCT/US2015/016858, dated Aug. 23, 2016.

International Preliminary Report on Patentability issued in International Patent Application No. PCT/US2015/016865, dated Aug. 23, 2016.

International Search Report and Written Opinion dated May 16, 2023 from International Application No. PCT/US2023/060044, International Filing Date Jan. 3, 2023.

International Search Report and Written Opinion for PCT Application No. PCT/US2013/055971, dated Oct. 24, 2013.

International Search Report and Written Opinion from International Application No. PCT/US2020/052138 dated Jan. 18, 2021, International Filing Date Sep. 23, 2020.

International Search Report and Written Opinion from International Application No. PCT/US2020/054470 dated May 2, 2021, International Filing Date Oct. 7, 2020.

International Search Report and Written Opinion issued in International Patent Application No. PCT/US2015/016858, dated May 15, 2015.

International Search Report and Written Opinion issued in International Patent Application No. PCT/US2015/016865, dated May 20, 2015.

International Search Report and written Opinion issued in International Patent Application No. PCT/US2017/044881, dated Oct. 18, 2017.

International Search Report and written Opinion issued in International Patent Application No. PCT/US2017/057161, dated Dec. 22, 2017.

International Search Report and written Opinion issued in International Patent Application No. PCT/US2019/016590, dated May 23, 2019.

(56) References Cited

OTHER PUBLICATIONS

International Search Report and written Opinion issued in International Patent Application No. PCT/US2020/025037, dated Jul. 16, 2020.
Joy et al., "Ultra-Low Intensity Refining of Short Fibered Pulps." African Pulp and Paper Week 2004 retrieved from URL:<https://www tappsa.eo.za/archive2/APPW 2004/Title2004/Ultra- low intensity refining/ultra-low intensity refining html>.
Korean Notice of Preliminary Rejection in corresponding Korean Patent application No. KR10-2022-7024842 dated Aug. 29, 2022 with English Translation.
Lavrykova-Marrain et al., "Characterizing the drainage resistance of pulp and microfibrillar suspensions using hydrodynamic flow measurements," TAPPI's PaperCon 2012 Conference.
Non-Final Office Action for U.S. Appl. No. 13/836,760, dated Oct. 15, 2015.
Notice of Acceptance for Australian Application No. 2013305802, dated Apr. 21, 2017.
Notice of Acceptance for New Zealand Application No. 705191, dated Apr. 13, 2017.
Notice of Allowance for Canadian Patent Application No. 2,883,161, Jan. 3, 2017.
Notice of Grant for Chinese Application No. 201380054919.2, mailed Nov. 14, 2017.
Notice of Reasons for Refusal issued in Japanese Patent Application No. 2018-090071, dated May 15, 2019.
Office Action issued in Corresponding Chinese Patent Application No. 201810081469.0, dated Jan. 21, 2020.
Office Action issued in corresponding European Patent No. 17195921 dated Apr. 17, 2019.
Office Action Issued in Corresponding Korean Patent Application No. 10-2015-7006955, dated May 29, 2020.
Office Action issued in Indian Patent Application No. 465/KOLNP/2015, dated May 7, 2019.
Office Action issued in Russian Patent Application No. 2018125883/12, dated Mar. 6, 2019.
Pal et al., "A Simple Method for Calculation of the Permeability Coefficient of Porous Media," TAPPI Journal, 5(9):10-16, (2006).
Pala et al., "Refining and Enzymatic Treatment of Secondary Fibres for Paperboard Production: Cyberflex Measurements of Fibre Flexibility" COST E20—Wood Fibre Cell Wall Structure 2001, 4 pages.
Restriction Requirement for U.S. Appl. No. 13/836,760, dated Jul. 16, 2015.
Smook, Handbook for Pulp and Paper Technologists, 1992, Angus Wilde Publications, 2nd Edition, Chapters 13, 15, 16 and 20 (Year: 1992).
Teixeira, "Recycled Old Corrugated Container Fibers for Wood-Fiber Cement Sheets," International Scholarly Research Network 2012(923413): 1-8, 2012.
Tonoli et al., "Effect of Fibre morphology on flocculation of fibre-cement suspensions," Cement and Concrete Research, 39:1017-1022, (2009).
Invitation to Pay Additional Fees and Where Applicable Protest Fee from International Patent Application No. PCT/US23/60044, dated Mar. 15, 2023.
International Search Report and Written Opinion from corresponding International Application No. PCT/US2020/052146 dated Dec. 8, 2020, International Filing Date Sep. 23, 2020.
International Search Report and Written Opinion issued in International Application No. PCT/US2020/028986, dated Jul. 17, 2020.
Liner International Paper, www.Internationalpaper.com/products/asia/containerboard/product-detail/liner-ipad, downloaded on Aug. 3, 2021, 3 pgs., Year 2021.
Norton, Sarilee, Lightweight Containerboard in North America—"Can You Hear Me Now?", Jan./Feb. 2013, PaperAge, pp. 18-21 (Year 2013.
Notice of Allowance Issued in Chinese Patent Application No. 201580020488.7, dated Apr. 8, 2018.
Office Action issued in Japanese Application No. 2016-552985, dated Apr. 10, 2018.
Smook, Handbook for Pulp and Paper Technologists, 1992, Angus Wilde Publications, 2nd Edition, Chapter 9 (Year: 1992).

* cited by examiner

PAPER PRODUCTS INCORPORATING SURFACE ENHANCED PULP FIBERS AND HAVING DECOUPLED WET AND DRY STRENGTHS AND METHODS OF MAKING THE SAME

CROSS-REFERENCE TO RELATED APPLICATIONS

This application is a U.S. National Application of International Patent Application No. PCT/US2020/052179 filed Sep. 23, 2020 and claims priority to and the benefit of U.S. Provisional Application No. 62/904,413, filed Sep. 23, 2019, the contents of both of which are incorporated into the present application by references in their entirety.

FIELD OF INVENTION

The present invention relates generally to paper products and, more particularly, to paper products that incorporate surface enhanced pulp fibers and have decoupled wet and dry strengths.

BACKGROUND

Paper products such as, for example, tissues (e.g., bath or facial tissues), paper towels, and paper napkins, in general, desirably have high strength and softness, where wet strength requirements are often the principal concern guiding the manufacturing of such products. The final paper characteristics may involve compromises between different attributes that can result from constraints imposed by the fibers used to make the paper product. For example, the dry strength and wet strength of prior art products are typically closely related and, as such, processes to promote wet strength (e.g., the addition of wet strength resins, refining, and/or the like) typically promote dry strength as well. However, dry strength and softness tend to be inversely related—increasing the proportion of strengthening fibers (e.g., softwood fibers) in the product may increase dry strength, and thus wet strength, at the expense of softness. As a result, attempts to increase wet strength generally involve a tradeoff with softness by virtue of the relationship (e.g., coupling) between wet strength and dry strength, even if the fiber structures that govern wet strength are not directly related to softness.

SUMMARY

There accordingly is a need in the art for paper products that can achieve a better combination of wet strength and softness than prior art products. The present paper products—which can include, without limitation, tissues (e.g., bath or facial tissues), paper towels, and paper napkins—address this need in the art by including surface enhanced pulp fibers (SEPF)—which can be highly fibrillated in a manner that significantly increases fiber surface area while mitigating reductions in fiber length—in addition to a plurality of unrefined or lightly fibrillated (compared to the SEPF) hardwood, softwood, and/or non-wood fibers. Such paper products can be embossed and/or have multiple plies that are laminated. Due at least in part to the unique fibrous structure of the SEPF—which can be relatively stiff and brittle—the embossing and/or lamination unexpectedly can cause failure of more SEPF bonds that contribute to the paper product's dry strength than SEPF bonds that contribute to the paper product's wet strength. Lamination and/or embossing thus may not yield a decrease in wet strength (e.g., wet burst) to the same extent as dry strength, meaning that wet strength and dry strength can be at least partially decoupled. As a result, laminated and/or embossed paper products with SEPF can have a higher ratio of wet burst to dry tensile strength than prior art products. These SEPF-containing products may be able to have a desired wet strength at a lower dry strength and thus may be softer, compared to otherwise similar prior art products (e.g., of the same basis weight and the like).

Some methods of making paper product comprise laminating and/or embossing one or more sheets, optionally two or more sheets. In some methods, laminating and/or embossing is performed such that a total dry tensile strength of the paper product is less than or equal to 90% of the sum of the total dry tensile strength(s) of the sheet(s). In some methods, each of the sheet(s) comprises a plurality of first fibers that are hardwood fibers and a plurality of second fibers. The second fibers, in some methods, include surface enhanced pulp fibers (SEPF) and, optionally, softwood fibers.

Some methods comprise making the sheet(s) at least by, for each of the sheet(s), forming a web from one or more furnishes that comprise fibers dispersed in water and at least partially dewatering the web to form the sheet. In some methods, the fibers of the furnish(es) comprise the first fibers, which are hardwood fibers, and the second fibers, which include the SEPF and/or softwood fibers. In some methods, by weight between 10% and 35% of the fibers of the furnish(es) are the first fibers and/or at least 40% of the fibers of the furnish(es) are the second fibers. Some methods comprise introducing one or more wet strength resins to the furnishes. The wet strength resin(s) comprise, in some methods, polyamide-epichlorohydrin and/or carboxymethyl cellulose. In some methods, introducing the wet strength resin(s) is performed such that, per ton of fiber in the furnish(es), at least 13 kilograms (kg) of polyamide-epichlorohydrin and/or at least 2.5 kg of carboxymethyl cellulose are introduced.

Some of the present paper products comprise a first plurality of fibers that are hardwood fibers and a second plurality of fibers. The second fibers, in some paper products, include SEPF and/or softwood fibers. In some paper products, by weight between 10% and 35% of the fibers of the paper product are the first fibers and/or at least 40% of the fibers of the paper product are the second fibers. Some paper products comprise, per ton of fiber in the paper product, at least 13 kilograms (kg) of polyamide-epichlorohydrin and/or at least 2.5 kg of carboxymethyl cellulose.

Some paper products comprise one or more, optionally two or more, plies that comprise the first and second fibers. For some paper products, the one or more plies comprise two or more plies that are coupled together and/or the paper product is embossed. Some paper products have a basis weight that is less than or equal to 26 gsm per ply. Some paper products are a paper towel.

In some embodiments, the SEPF are made by refining a pulp feed, the refining including for each of one or more refiners introducing the pulp feed between two refining elements of the refiner and rotating at least one of the refining elements, wherein refining the pulp feed is performed such that the refiner(s) consume at least 300 kilowatt-hours (kWh) per ton of fiber in the pulp feed. Each of the refining elements, in some embodiments, comprise a plurality of bars, each protruding from a surface of the refining element and having a width that is less than or equal to 1.3 millimeters (mm), and a plurality of grooves defined by the bars, each having a width that is less than or equal to 2.5 mm. The SEPF, in some embodiments, have a length weighted average fiber length that is at least 0.20 millimeters (mm), optionally at least 0.40 mm, and/or an average hydrodynamic specific surface area that is at least 10 square meters per gram ($m^2/g$), optionally at least 12 $m^2/g$. In some embodiments, by weight at least 90% of the second fibers are the softwood fibers and/or between 1% and 10% of the second fibers are the SEPF.

The term “coupled” is defined as connected, although not necessarily directly, and not necessarily mechanically; two items that are “coupled” may be unitary with each other. The terms “a” and “an” are defined as one or more unless this disclosure explicitly requires otherwise. The term “substantially” is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the terms “substantially” and “approximately” may be substituted with “within [a percentage] of” what is specified, where the percentage includes 0.1, 1, 5, and 10 percent.

The terms “comprise” and any form thereof such as “comprises” and “comprising,” “have” and any form thereof such as “has” and “having,” and “include” and any form thereof such as “includes” and “including” are open-ended linking verbs. As a result, a product or system that “comprises,” “has,” or “includes” one or more elements possesses those one or more elements, but is not limited to possessing only those elements. Likewise, a method that “comprises,” “has,” or “includes” one or more steps possesses those one or more steps, but is not limited to possessing only those one or more steps.

Any embodiment of any of the products, systems, and methods can consist of or consist essentially of—rather than comprise/include/have—any of the described steps, elements, and/or features. Thus, in any of the claims, the term “consisting of” or “consisting essentially of” can be substituted for any of the open-ended linking verbs recited above, in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

Figure 1:
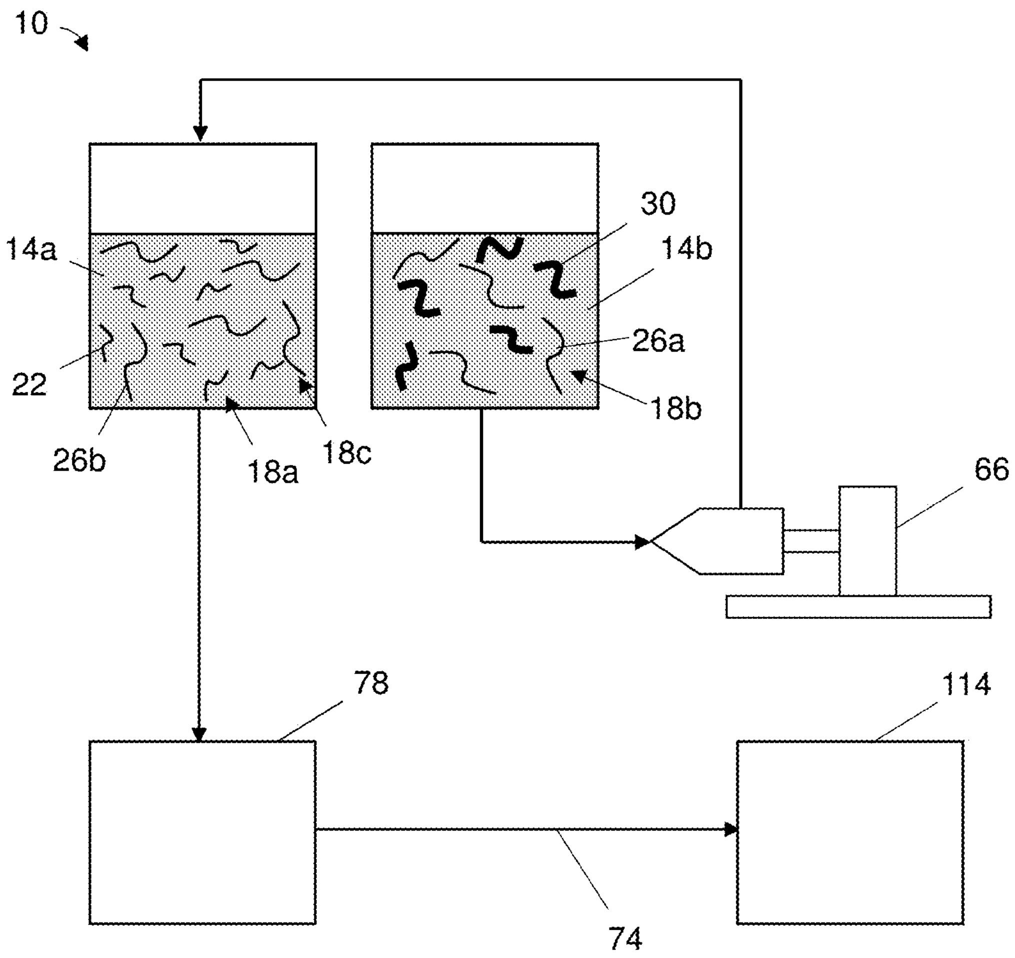
FIG. 1 is a schematic of a system that can be used to perform some of the present methods of making a paper product that comprises SEPF.

Beginning with FIG. 1, shown is a system 10 that can be used to perform some of the present methods. While some methods are described with reference to system 10, system 10 is not limiting on those methods, which can be performed using any suitable system. As an illustration, such suitable systems can include—but are not limited to—VALMET®'s ADVANTAGE™ QRT®, eTAD™, and NTT® systems and VOITH®'s ATMOS® system.

Figure 4:
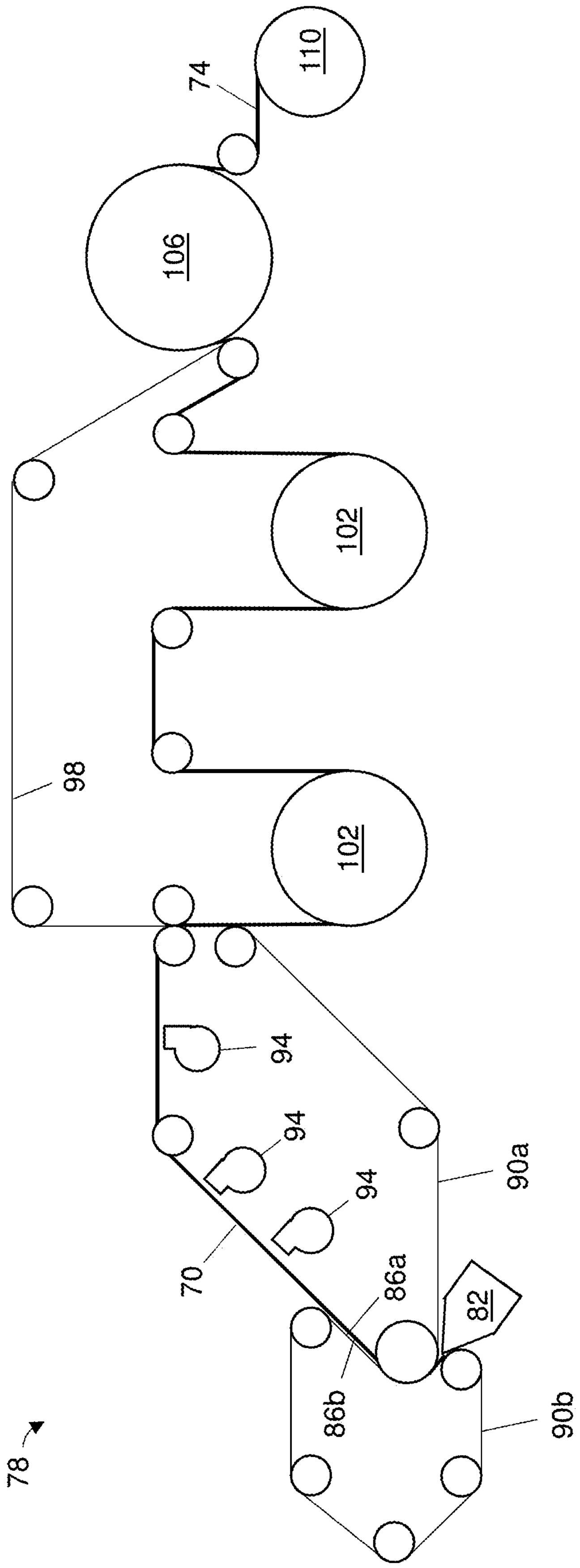
FIG. 4 is a schematic of a forming unit of the system of FIG. 1 that can be used to form one or more plies of one of the present paper products. As shown, the forming unit is configured for a through-air drying (TAD) process.

Some methods of making a paper product (e.g., a tissue, paper towel, or paper napkin) can include a step of making one or more sheets (e.g., 74), each of which—as explained below—can define a respective ply of the paper product. Each of the sheet(s) can be made using one or more furnishes (e.g., 14*a* and 14*b*) (FIGS. 1 and 4). The furnish(es) can comprise fibers (e.g., cellulosic fibers) dispersed in water, including hardwood fibers (e.g., originating from oak, gum, maple, poplar, eucalyptus, aspen, birch, and/or the like), softwood fibers (e.g., originating from spruce, pine, fir, hemlock, redwood, and/or the like), and/or non-wood fibers (e.g., originating from kenaf, hemp, straws, bagasse, and/or the like). Optionally, at least some of the fibers can be recycled fibers. For example, the furnish(es) can include a plurality of first fibers (e.g., 18*a*) that can be hardwood fibers—which can contribute to the softness of the paper product—and a plurality of second fibers (e.g., 18*b*) that, to promote strength, can include softwood fibers (e.g., 26*a*) and a plurality of highly fibrillated fibers (e.g., 30), referred to herein as “surface enhanced pulp fibers” (SEPF), that can be softwood fibers, hardwood fibers, or non-wood fibers. The furnish(es) can also include a plurality of third fibers (e.g., 18*c*) that can be softwood fibers (e.g., 26*b*) of a different grade than the softwood fibers of the second fibers.

To illustrate, the furnish(es) can comprise a first furnish (e.g., 14*a*) and a second furnish (e.g., 14*b*). The first furnish can comprise the first fibers and, optionally, the third fibers (e.g., such that at least 90% of the fibers of the first furnish, by weight, are the first and, optionally, third fibers). The second furnish can comprise the second fibers (e.g., such that at least 90% of the fibers of the second furnish, by weight, are the second fibers). In other embodiments, however, the fibers can be distributed amongst any suitable number of furnishes in any suitable manner.

Figure 2A:
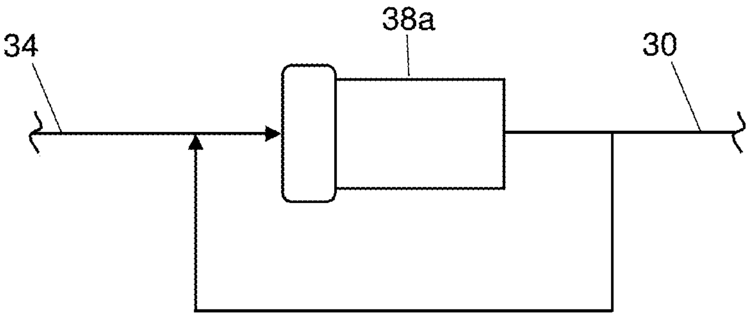
FIG. 2A is a schematic of a refining unit that can be used to produce surface enhanced pulp fibers. The refining unit of FIG. 2A includes a single refiner through which a pulp feed can be recirculated.
Figure 2B:
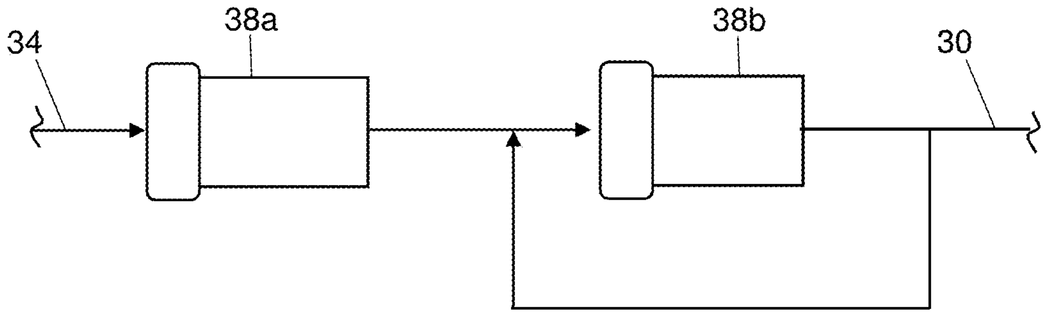
FIG. 2B is a schematic of another refining unit that can be used to produce surface enhanced pulp fibers. The refining unit of FIG. 2B includes two refiners, where a pulp feed can be recirculated through one of the refiners.
Figure 3:
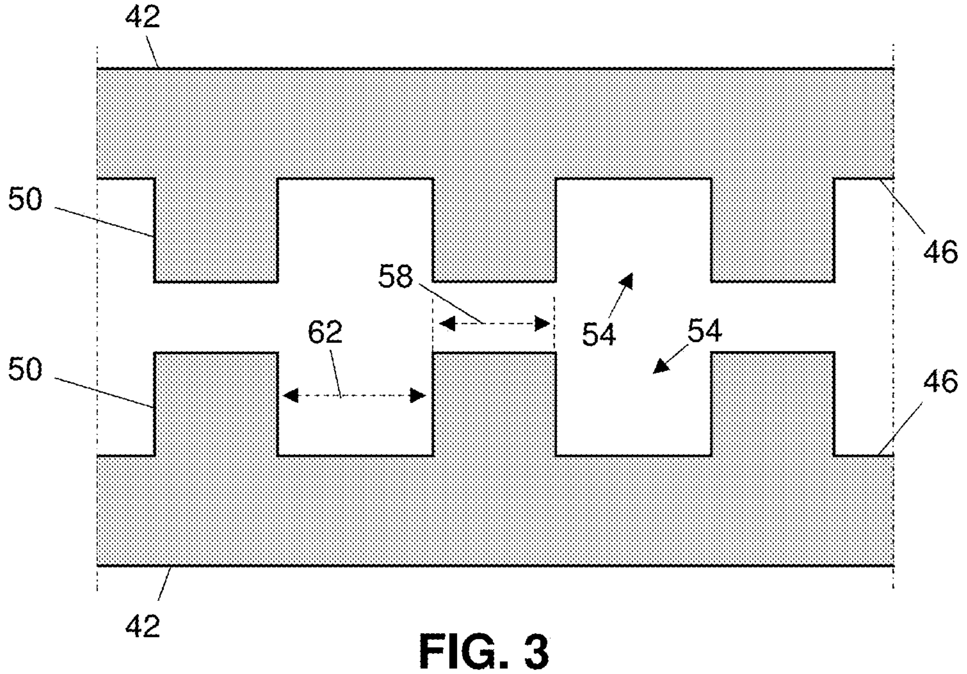
FIG. 3 is a schematic of two refining elements that can be used in the refiner(s) of FIGS. 2A and 2B to produce surface enhanced pulp fibers.

The non-SEPF fibers of the furnish(es) (e.g., the hardwood and softwood fibers) can be unrefined or lightly fibrillated (compared to the SEPF)—those hardwood fibers and/or softwood fibers can have, for example, an average hydrodynamic specific surface area that is less than any one of, or between any two of, 3 square meters per gram ($m^2/g$), 2.5 $m^2/g$, 2 $m^2/g$, 1.5 $m^2/g$, or 1 $m^2/g$ (e.g., less than 2 $m^2/g$). The SEPF can have higher surface areas compared to conventionally-refined fibers, and can be made in a manner that mitigates reductions in fiber length that occur in conventional refining processes. For example, the SEPF can be made by refining a pulp feed (e.g., 34) with one or more mechanical refiners (e.g., 38*a* and/or 38*b*) (FIGS. 2A and 2B). Referring additionally to FIG. 3, each of the refiner(s) can comprise at least two refining elements (e.g., 42), each including a plurality of bars (e.g., 50) that extend outwardly from a surface (e.g., 46) of the refining element and define a plurality of grooves (e.g., 54). For example, each of the refiner(s) can be a disk refiner (e.g., a single-disk refiner, a double-risk refiner, or a multi-disk refiner) (e.g., in which the refining elements are refiner plates) or a conical refiner (e.g., in which the refining elements are conical refiner fillings).

The pulp feed can be refined at least by, for each of the refiner(s), introducing the pulp feed between the refining elements and rotating at least one, optionally each, of the refining elements. The bars can thereby impart compression and shearing forces on the fibers of the pulp feed to increase the fibrillation, and thus the average hydrodynamic specific surface area, thereof. To facilitate a high degree of fibrillation while mitigating undesired reductions in fiber length, each of the refining elements can have a fine bar pattern and, optionally, the refiner(s) can be operated at a low intensity (e.g., at a low specific edge load (SEL)), compared to conventional refining processes. For example, for each of the refining elements, each of the bars can have a width (e.g., 58) that is less than or equal to any one of, or between any two of, 1.3 millimeters (mm), 1.2 mm, 1.1 mm, 1.0 mm, 0.9 mm, or 0.8 mm (e.g., less than or equal to 1.3 mm or 1.0 mm) and each of the grooves can have a width (e.g., 62) that is less than or equal to any one of, or between any two of, 2.5 mm, 2.3 mm, 2.1 mm, 1.9 mm, 1.7 mm, 1.5 mm, or 1.3 mm (e.g., less than or equal to 2.5 mm, 1.6 mm, or 1.3 mm). And, refining the pulp feed can be performed such that each of the refiner(s) operates at a SEL that is less than or equal to any one of, or between any two of, 0.70 Watt-seconds per meter (W·s/m), 0.60 W·s/m, 0.50 W·s/m, 0.40 W·s/m, 0.30 W·s/m, 0.25 W·s/m, 0.20 W·s/m, 0.15 W·s/m, or 0.10 W·s/m (e.g., between 0.1 and 0.3 W·s/m or 0.1 and 0.2 W·s/m).

The pulp feed can be refined using a large amount of refining energy, compared to conventional processes, to achieve a high degree of fibrillation. For example, refining the pulp feed can be performed such that, per ton of fiber in the pulp feed, the refiner(s) consume greater than or equal to any one of, or between any two of, 300 kilowatt-hours (kWh), 400 kWh, 500 kWh, 600 kWh, 700 kWh, 800 kWh, 900 kWh, or 1,000 kWh (e.g., greater than or equal to 300 kWh or 650 kWh per ton of fiber in the pulp feed). The refining energy expended can depend at least in part on the type of fibers in the pulp feed and the desired degree of fibrillation. Without limitation, when the pulp feed includes hardwood fibers, the refining energy can be between 300 and 650 kWh per ton of fiber and when the pulp feed includes softwood fibers, the refining energy can be at least 650 kWh, optionally at least 1,000 kWh, per ton of fiber (e.g., because softwood fibers, which are typically longer than hardwood fibers, may be subjected to more refining than hardwood fibers before fiber shortening and fines production adversely affects fiber quality).

Such refining energies can be reached in any suitable manner. For example, each of the refiner(s) can consume, per ton of fiber in the pulp feed, less than or equal to any one of, or between any two of, 110 kWh, 100 kWh, 90 kWh, 80 kWh, 70 kWh, 60 kWh, 50 kWh, 40 kWh, or 30 kWh each time the pulp feed is passed through the refiner. To reach the total desired refining energy, the pulp feed can be recirculated through at least one of the refiner(s) and/or passed through multiple refiners such that the cumulative energy consumed by the refiner(s) reaches the desired level (e.g., at least 300 kWh or 650 kWh per ton of fiber). Referring to FIG. 2A, for example, the one or more refiners can consist of a single refiner (e.g., 30*a*) (e.g., where, for each of the refiner's refining elements, each of the bars has a width that is less than or equal to 1.3 mm and each of the grooves has a width that is less than or equal to 1.6 mm) and the pulp feed can be passed through the refiner a plurality of times (e.g., greater than or equal to any one of, or between any two of, 2, 6, 10, 14, 18, 22, or 26 times) until the refiner consumes the desired refining energy. Alternatively, and referring to FIG. 2B, the one or more refiners can comprise one or more first refiners (e.g., 30*a*) (e.g., a single first refiner) and one or more second refiners (e.g., 30*b*) such that the pulp feed passes through multiple refiners. Each of the first refiner(s) can be configured to fibrillate the fibers of the pulp feed with less refinement than the second refiner(s). For example, for each of the first refiner(s), each of the bars can have a width that is greater than or equal to 1.0 mm, each of the grooves can have a width that is greater than or equal 1.6 mm, and the first refiner can operate at a SEL between 0.2 and 0.3 W·s/m. The pulp feed can be introduced into the second refiner(s) after passing through the first refiner(s) and, for each of the second refiner(s), each of the bars can have a width that is less than or equal to 1.0 mm, each of the grooves can have a width that is less than or equal to 1.6 mm, and the second refiner can operate at a SEL between 0.1 and 0.2 W·s/m. The pulp feed can be recirculated through at least one of the second refiner(s) (e.g., as described with respect to FIG. 2A).

Such high-energy refining (e.g., at least 300 kWh per ton of fiber) performed using refining elements having a fine bar pattern (e.g., any of those described above) and/or at low intensity (e.g., at a SEL between 0.1 and 0.3 W·s/m) can yield larger increases in the average hydrodynamic specific area of the fibers of the pulp feed than conventional refining processes while mitigating reductions in fiber length. For example, the pulp feed can be refined such that the average hydrodynamic specific surface area of the pulp fibers increases by at least 300% (e.g., at least 700%) while the length weighted average fiber length of the fibers decreases by less than 30%. To illustrate, the SEPF can have a length weighted average fiber length that is greater than or equal to any one of, or between any two of, 0.20 millimeters (mm), 0.30 mm, 0.40 mm, 0.50 mm, 0.60 mm, 0.70 mm, 0.80 mm, 0.90 mm, 1.0 mm, 1.5 mm, or 2.0 mm (e.g., greater than or equal to 0.20 mm, 0.30 mm, or 0.40 mm or between 1.0 mm and 2.0 mm), and an average hydrodynamic specific surface area that is greater than or equal to any one of, or between any two of, 10 square meters per gram ($m^2/g$), 12 $m^2/g$, 14 $m^2/g$, 16 $m^2/g$, 18 $m^2/g$, 20 $m^2/g$, or larger (e.g., greater than or equal to 10 $m^2/g$). Optionally, the number of SEPF can be at least 12,000 per milligram on an oven-dry basis (e.g., based on a sample of the SEPF that is dried in an oven set at 105° C. for 24 hours). A description of SEPF and processes by which SEPF can be made are set forth in further detail in U.S. patent application Ser. No. 13/836,760, filed Mar. 15, 2013, and published as Pub. No. US 2014/0057105 on Feb. 27, 2014, which is hereby incorporated by reference.

The first, second, and third fibers can be obtained from any suitable process, such as, for example, a chemical process (e.g., a kraft process), a mechanical process, a thermomechanical process, a chemi-thermomechanical process, a recycling process, and/or the like, and can be bleached or unbleached. For example, softwood fibers **26*a* and/or the SEPF can be northern bleached softwood kraft (NBSK) pulp fibers and/or the hardwood fibers can be bleached eucalyptus (BEK) fibers; in other embodiments, however, the hardwood fibers, softwood fibers, and SEPF can be of any suitable type or combination of types. The third fibers, if present, can be softwood fibers (e.g., 26*b*) of a different grade (e.g., southern bleached softwood kraft (SBSK) pulp fibers) than softwood fibers 26*a***; the third fibers can also strengthen the paper product. Including such fiber types in the furnish(es), and thus the paper product, can yield a desired combination of strength and softness.

Any suitable proportion of first, second, and third fibers (if present) can be included in the furnish(es) such that the paper product has a suitable strength, softness, and absorbency for its intended application. Strength (e.g., wet and/or dry tensile strength) can be positively correlated with the proportion of the second fibers (e.g., softwood fibers **26*a* and the SEPF) in the paper product, while softness (e.g., related to stiffness and/or surface friction) can be positively correlated with the proportion of the first fibers (e.g., the hardwood fibers) in the paper product. As such, to make a paper product with a relatively high wet strength—such as a facial tissue, towel, or paper napkin—a minority of the fibers of the furnish(es), and thus of the paper product, can be the first fibers, e.g., by weight, less than or equal to any one of, or between any two of, 40%, 30%, 20%, or 10% of the fibers can be the first fibers (e.g., the hardwood fibers) and greater than or equal to any one of, or between any two of, 40%, 50%, 60%, 70%, 80%, or 90% of the fibers can be the second fibers (e.g., softwood fibers 26*a*** and the SEPF). The furnish(es), when including the third fibers, can have more second fibers than third fibers (e.g., when making a paper towel). For example, by weight, greater than or equal to any one of, or between any two of, 35%, 40%, 45%, 50%, 55%, 60%, or 65% of the fibers can be the second fibers and greater than or equal to any one of, or between any two of, 10%, 15%, 20%, 25%, or 30% of the fibers can be the third fibers.

These relationships between strength, softness, and the proportions of first and second fibers may not be monotonic, at least when the second fibers include SEPF. For example, increasing the proportion of the first fibers (e.g., the hardwood fibers) may improve the produced paper product's softness up to a point, after which doing so may not yield an improvement in softness and can reduce strength, a sub-optimal result. The first and second fibers can be incorporated into the furnish(es) in proportions that avoid such a sub-optimal combination of strength and softness. For example, to make a high-strength product such as a paper towel, by weight between 10% and 35% (e.g., between 15% and 25%) of the furnish(es)'s fibers can be the first fibers and at least 40% (e.g., at least 50%) of the furnish(es)'s fibers can be the second fibers. Optionally, when the furnish(es) include the third fibers, between 15% and 35% of the fibers can be the third fibers (e.g., softwood fibers **26*b***).

A paper product formed from furnish(es) having such proportions of the first and second fibers can be stronger than otherwise similar products that do not comprise SEPF. Such enhanced strength can be achieved when at least a majority of the second fibers are softwood fibers **26*a***, e.g., by weight, greater than or equal to any one of, or between any two of, 50%, 60%, 70%, 80%, or 90% (e.g., at least 90%) of the second fibers can be the softwood fibers while less than or equal to any one of, or between any two of, 40%, 30%, 20%, 10%, or 5% (e.g., between 1% and 10%) of the second fibers can be the SEPF. The inclusion of the SEPF in the furnish(es) can yield a paper product with higher strengths (e.g., dry and/or wet tensile strengths) than otherwise comparable products at least in part because of the comparatively long fiber lengths and high surface areas of the SEPF. The large hydrodynamic specific surface area of the SEPF, for example, can promote chemical bonding.

The enhanced strength imparted by SEPF can also be attributable at least in part to their ability to accommodate larger amounts of wet strength resins. Some methods include a step of introducing one or more wet strength resins to the furnish(es). The wet strength resin(s) can include any suitable resins, such as, for example, one or more cationic wet strength resins. To illustrate, the wet strength resin(s) can comprise polyamide-epichlorohydrin (PAE) and/or carboxymethyl cellulose. Other suitable wet strength resins can include a polyacrylamide resin, urea formaldehyde resins, melamine formaldehyde resins, polythylenimine resins, and/or the like. Yet further suitable wet strength resins are set forth in Wet Strength in Paper and Paperboard, TAPPI Monograph Series No. 29 (Technical Association of the Pulp and Paper Industry, New York, 1965), which is hereby incorporated by reference. Other compounds to facilitate production and/or provide desired attributes can be introduced as well, such as debonders, biocides, defoamers, and/or the like. The wet strength resin(s) can promote wet strength in the formed paper product, and can be added in any suitable amounts to achieve a desired wet strength. For example, when making a paper towel, introducing the wet strength resin(s) can be performed such that, per ton of fiber in the furnish(es), greater than or equal to any one of, or between any two of, 6 kilograms (kg), 7 kg, 8 kg, 9 kg, 10 kg, 11 kg, 12 kg, 13 kg, 14 kg, 15 kg, 16 kg, 17 kg, or 18 kg (e.g., greater than or equal to 13 kg) of PAE are introduced and/or greater than or equal to any one of, or between any two of, 1.8 kg, 1.9 kg, 2.0 kg, 2.1 kg, 2.2 kg, 2.3 kg, 2.4 kg, 2.5 kg, 2.6 kg, 2.7 kg, or 2.8 kg (e.g., greater than or equal to 2.5 kg) of carboxymethyl cellulose are introduced. In prior art methods, the amount of wet strength resin(s) retainable by conventional fibers is limited; SEPF can retain more chemicals than conventional fibers and, as such, the above-described amounts of wet strength resin(s) may be higher than those used in prior art methods. As described in further detail below, these amounts can promote better ratios of wet strength to dry strength.

Some methods comprise a step of refining at least some of the furnish(es) with one or more refiners (e.g., 66). For example, as shown the second furnish can be beaten with one or more mechanical refiners to fibrillate (or further fibrillate) the softwood fibers and/or SEPF. Each of the mechanical refiner(s) can be any suitable refiner, such as, for example, a double disk refiner, a conical refiner, a single disk refiner, a multi-disk refiner, a conical refiner, and/or the like. The second furnish can also be refined chemically in addition to or instead of mechanical refining, such as with one or more enzymes (e.g., cellulases and/or xylanases). Refining can be performed such that the second furnish reaches a freeness that is less than or equal to any one of, or between any two of, 620 ml CSF, 600 ml CSF, 580 ml CSF, 560 ml CSF, 540 ml CSF, 520 ml CSF, 500 ml CSF, 480 ml CSF, 460 ml CSF, 440 ml CSF, 420 ml CSF, 400 ml CSF, 380 ml CSF, or 360 ml CSF (e.g., less than or equal to 620 ml CSF, at least for towel). The presence of SEPF in the second furnish may reduce the refining energy required to achieve a desired freeness, and thus strength, compared to conventional processes. For example, in some methods beating the second furnish can be performed until the refiner(s) consume less than or equal to 30 kWh (e.g., between 20 and 30 kWh) (e.g., if the paper product is a paper towel) per ton of fiber in the second furnish. The first furnish, in some methods, is not refined (which may, at least in some instances, preserve the fiber length of the hardwood fibers thereof). Such selective refining of furnishes can facilitate production of a paper product having a combination of strength and softness that is better than that of prior art products.

The sheet(s) can be made in one or more forming units (e.g., 78) (FIG. 4). For each of the sheet(s), some methods comprise a step of forming a web (e.g., 70) at least by depositing the furnish(es) onto one or more moving surface(s) (e.g., 86*a* and 86*b*) (e.g., with one or more, optionally two or more, head boxes (e.g., 82)). For example, the forming unit can comprise a twin-wire former including two wires (e.g., 90*a* and 90*b*) and the furnish(es) can be deposited onto and/or between the moving surfaces of the wires. Any suitable combination of the furnish(es) can be used to form the web. For example, the first furnish and the refined second furnish can be combined (e.g., as shown) and the web can be formed from at least the combined first and second furnishes (e.g., such that the web, and thus the sheet, comprises a single layer). The combined furnishes can be deposited with a single head box or with multiple head boxes. In other embodiments, however, the furnish(es) can be deposited onto the moving surface(s) to form a multi-layered web (and thus a multi-layered sheet) (e.g., by using multiple head boxes). As an illustration, the layers can include one or more first fiber layers comprising the first and, optionally, third fibers and one or more second fiber layers comprising the second fibers. The furnish(es) can be deposited such that the web has any of the above described proportions of first fibers, second fibers, and, optionally, third fibers.

Some methods comprise a step of at least partially dewatering the web to form the sheet. The web can be at least partially dewatered at least by drawing water from the web with one or more vacuums (e.g., 94) (e.g., while the web is disposed on at least one of the moving surface(s)). Dewatering can also, but need not, be achieved in a TAD process. For example, as shown, the web can be transferred to a fabric (e.g., 98) (e.g., a woven fabric, which can provide three-dimensional structure for the web) and passed partially around each of one or more—optionally two or more—TAD rolls (e.g., 102) and, while being passed partially around the TAD roll(s), a gas (e.g., air) can be directed through the web. The gas can be heated to facilitate drying. This can be done, for example, by burning a fuel such as a combustible gas (e.g., natural gas) to heat air. The web can also be passed partially around a Yankee dryer (e.g., 106), which can be a heated vessel. The Yankee dryer can be heated using steam, which may be directed into the vessel where the steam can transfer heat to the outer surface thereof, condense, and be collected.

While SEPF can have a higher water retention value (WRV) than unfibrillated or lightly fibrillated fibers, the inclusion of SEPF in the web can unexpectedly facilitate drying (e.g., by reducing fuel and/or steam requirements for the TAD roll(s) and Yankee dryer, respectively), particularly when the basis weight of the web is comparatively low. For at least some high-strength products such as paper towels, to achieve a suitable level of drying, the total flow of fuel (e.g., natural gas) to heat the gas (e.g., air) for all (e.g., two) TAD roll(s) can be less than or equal to any one of, or between any two of, 223 kg/hr, 221 kg/hr, 219 kg/hr, 217 kg/hr, 215 kg/hr, or 213 kg/hr. This may be at least 7% lower than that required for a web that does not include SEPF. And, the flow of steam for the Yankee dryer can be less than or equal to any one of, or between any two of, 1020 kg/hr, 1010 kg/r, 1000 kg/hr, 990 kg/hr, 980 kg/r, 970 kg/hr, or 960 kg/hr, which may similarly be at least 7% lower than that required for SEPF-free webs.

The surface of the Yankee dryer can be coated with a polymer (e.g., adhesive) that can facilitate retention of the web on the Yankee dryer. A creping blade can be configured to remove the web from the Yankee dryer and/or can crepe the web. The coating deposited on the Yankee dryer's surface can include a releasing agent to facilitate this removal. The formed sheet can be wound onto a reel (e.g., 110) to form a roll. Such a TAD process can promote high bulk in the paper product to achieve lower basis weights; however, in other embodiments, any suitable forming process can be used to make the sheet(s).

Figure 5:
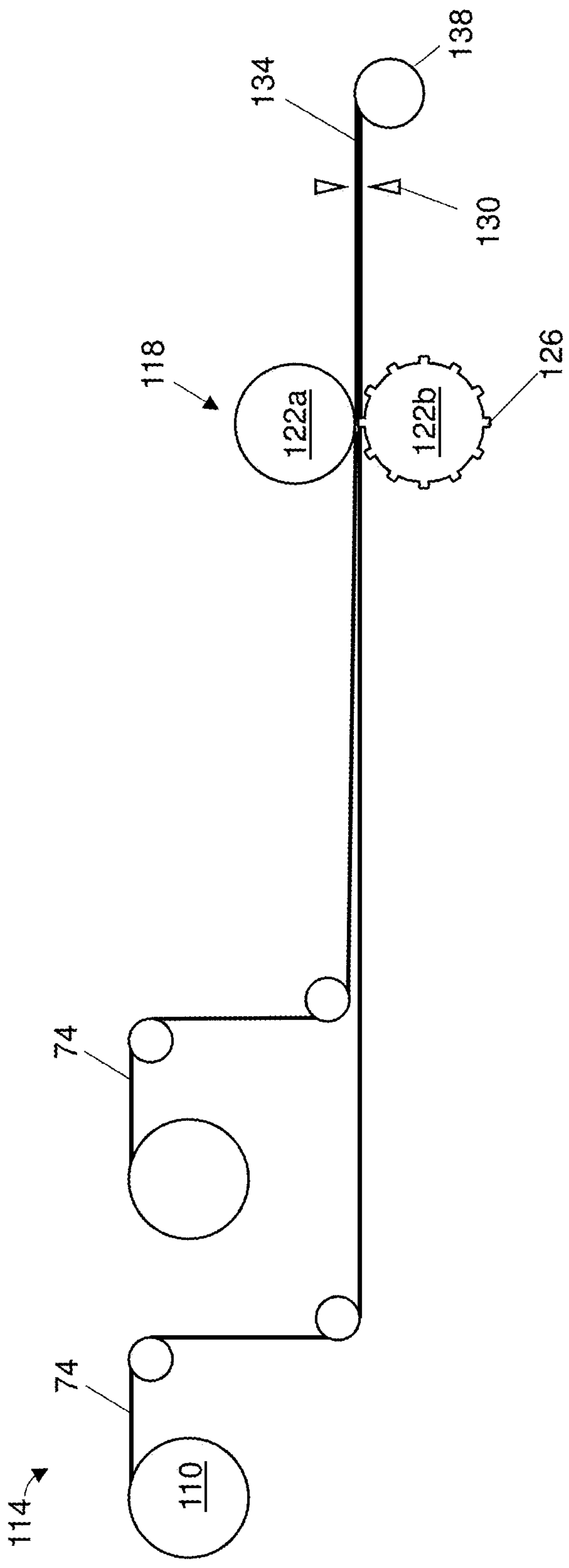
FIG. 5 is a schematic of a conversion unit of the system of FIG. 1 that can be used to laminate and/or emboss sheet(s) produced by the forming unit.

One or more—optionally two or more—sheets can be formed as described above. Some methods comprise a step of embossing the sheet(s) and/or—if multiple sheets are produced—laminating the sheets in a conversion unit (e.g., 114) (FIG. 5). Each of the sheet(s) can define a respective ply of the paper product (e.g., 134). For example, to make a multi-ply paper product, if each of the sheets is wound onto a reel, the rolls can be unwound and the sheets can be layered. The layered sheets can be embossed with an embosser (e.g., 118) that, optionally, comprises two or more pressing elements (e.g., 122*a* and 122*b*) (e.g., two or more rollers). The layered sheets can be passed between the pressing elements, at least one of which can comprise a plurality of protrusions (e.g., 126) such that the sheets are embossed. The embossing and laminating can be performed simultaneously, e.g., the embossing can cause and/or facilitate bonding of the sheets. However, in other embodiments, lamination can be performed in any suitable manner, such as, for example, by applying an adhesive, ultrasonic bonds, and/or the like. Laminating and embossing may also be performed separately, e.g., the sheets can be embossed after lamination and/or at least one of the sheets can be embossed prior to lamination. While as shown multiple sheets are laminated to form a multi-ply paper product (e.g., having two or more plies), in other embodiments a single-ply paper product can be formed from a single sheet (e.g., with no lamination, whether or not the single sheet is embossed).

The lamination and/or embossing can cause at least some SEPF bonds that contribute to the dry strength of the paper product to fail. That is, laminating and/or embossing the sheet(s) can be performed such that the total dry tensile strength of the paper product is less than or equal to any one of, or between any two of, 95%, 90%, 85%, 80%, 75%, or 70% (e.g., less than or equal to 90%) of the sum of the total dry tensile strength(s) of the sheet(s) (e.g., before lamination and/or embossing). As used herein, total dry tensile strength is the sum of the machine direction (MD) and cross direction (CD) dry tensile strengths. Yet, unexpectedly, the lamination and/or embossing may not reduce the paper product's wet strength (compared to the combined wet strength(s) of the sheet(s) before lamination and/or embossing), at least not to the extent to which dry strength is reduced (e.g., such that wet strength and dry strength are at least partially decoupled). As a result, the ratio of the paper product's wet burst to total dry tensile strength can be higher than that of prior art products, such as, for example, greater than or equal to any one of, or between any two of, 3.8, 3.9, 4.0, 4.1, 4.2, 4.3, 4.4, 4.5, 4.6, or 4.7 (e.g., greater than or equal to 3.9 or 4.0). Such a result can be attributed at least in part to the unique characteristics of SEPF, which may create a stiffer structure in the sheet(s) that is more brittle compared to the fiber structures of conventional paper products and, as such, has dry strength bonds that are more susceptible to failure than wet strength bonds during lamination and embossing.

This aspect of SEPF, which can yield the improved ratio of wet burst to total dry tensile strength, can be advantageous for paper products in which wet strength is an important design parameter, such as for paper towels, facial tissues, and/or paper napkins. Because, as described above, dry strength and softness can be inversely related, laminating and/or embossing SEPF-containing sheet(s) can promote softness at the expense of dry strength but, due at least in part to the unique characteristics of the SEPF, with little, if any, effect on wet strength (e.g., wet burst). In this manner, the paper product can achieve a wet strength requirement (e.g., as dictated by the intended use of the product) at a lower dry strength—and thus may be softer—than conventional products configured to meet the same requirement.

As mentioned above, the amount of wet strength resin(s) in the furnish(es)—and thus the sheet(s) and paper product—can affect the ratio of wet burst to total dry tensile strength. For example, more wet strength resin(s) can be introduced to the furnishes than in conventional processes (e.g., per ton of fiber in the furnish(es), at least 13 kg of PAE and at least 2.5 kg of carboxymethyl cellulose) can yield a paper product having a comparatively higher wet burst to dry tensile ratio (e.g., at least 4.1 and, in some instances, at least 4.3). The paper product can also be made (e.g., forming, laminating, and/or embossing the sheet(s) can be performed) such that it has a basis weight that is lower than that of prior art paper products, which can also promote a higher ratio of wet burst to total dry tensile strength. For example, the paper product can have a basis weight per ply (e.g., the total basis weight of the paper product divided by the number of plies thereof) that is less than or equal to any one of, or between any two of, 26 gsm, 25 gsm, 24 gsm, 23 gsm, 22 gsm, or 21 gsm (e.g., less than or equal to 26 gsm per ply), which can be lower than that of otherwise similar high-strength paper products such as paper towels. The basis weight of each of the sheet(s) may be lower than the per ply basis weight of the paper product, at least for some multi-ply paper products where the laminating process can increase the weight thereof. And, in at least some instances, performing comparatively less refining of some of the furnish(es) (e.g., beating the second furnish(es) using less than or equal to 30 kWh per ton of fiber in the second furnish(es), for a paper towel) can promote a higher ratio of wet burst to total dry tensile strength as well.

The paper product can be subject to one or more processes after lamination and/or embossing to prepare the product for market. For example, the produced paper product (e.g., a paper towel) can be rolled onto one or more reels (e.g., 138). When multiple reels are used, for at least one of the reels the paper product can be cut (e.g., with a cutter 130) after rolling a portion of the paper product onto the reel (e.g., to separate the portion of the paper product and thereby form a roll of a desired size). Other packaging techniques can be used as well. For example, when the paper product is a facial tissue, cut portions of the tissue can be folded and/or packaged in a box.

Figure 6A:
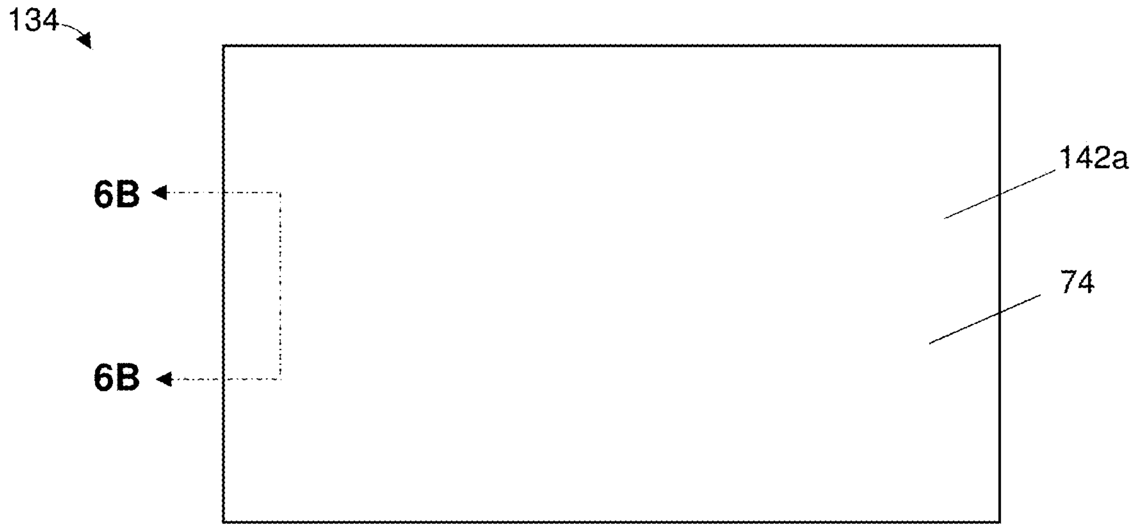
FIG. 6A is a top view of an embodiment of the present paper products.
Figure 6B:
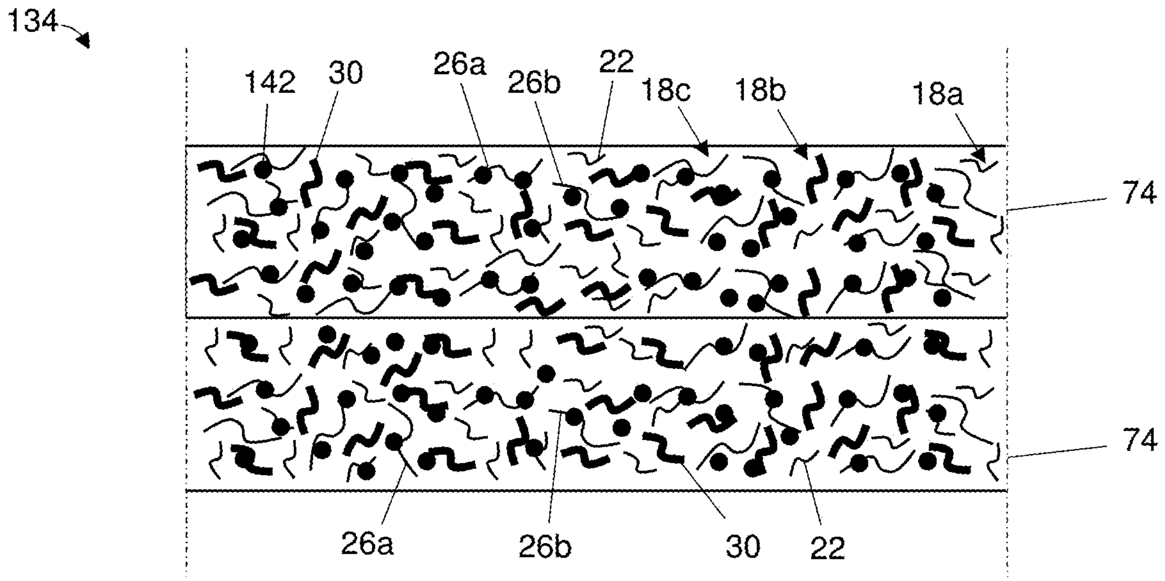
FIG. 6B is a sectional view of the paper product of FIG. 6A taken along line 6B-6B and shows the plies thereof.

Referring to FIGS. 6A and 6B, shown is a paper product 134 that can be produced according to some of the present methods. As shown, paper product 134 is a paper towel; in other embodiments, however, the paper product can be any suitable paper product, such as, for example, a tissue (e.g., facial tissue), a paper napkin, printing paper, and/or the like.

Paper product 134 can have any of the fiber contents described above with respect to the furnish(es). For example, paper product 134 can comprise first fibers **18*a* (e.g., hardwood fibers 22), second fibers 18*b* (e.g., softwood fibers 26*a* and SEPF 30), and, optionally, third fibers 18*c* (e.g., softwood fibers 26*b*), optionally in the proportions in which the fibers were present in the furnish(es) used to make the paper product (e.g., by weight, at least 90% of the second fibers can be softwood fibers 26*a* and between 1% and 10% of the second fibers can be SEPF 30**, and, at least when making a high-strength product such as a paper towel, between 10% and 35% of the fibers of the paper product can be the first fibers, at least 40% of the fibers of the paper product can be the second fibers, and optionally between 15% and 35% of the fibers of the paper product can be the third fibers).

Paper product 134 can also comprise one or more wet strength resins 142 and/or other compounds that can facilitate production or promote desired attributes, such as any of those described above (e.g., PAE and/or carboxymethyl cellulose). Wet strength resin(s) 142 can be incorporated in paper product 134 in any of the above-described proportions (e.g., per ton of fiber in the paper product at least 13 kg of PAE and at least 2.5 kg of carboxymethyl cellulose).

Paper product 134 can comprise one or more, optionally two or more, plies 74 (e.g., the paper product can be a single-ply or a multi-ply product) that are coupled together and/or can be embossed (e.g., such that the paper product has any of the above-described ratios of wet burst to total dry tensile strength). As shown paper product 134 has two plies 74. Each of plies 74 can have a single fiber layer (e.g., as shown) or two or more fibers layers, and first, second, and third fibers **18*a*-18*c* can be distributed in any suitable manner between the plies. As shown, each of plies 74 has an equal proportion of the first, second, and third fibers; however, in other embodiments the plies can have different fiber compositions. And paper product 134** can have any of the above-described per ply basis weights.

EXAMPLES

The present invention will be described in greater detail by way of specific examples. The following examples are offered for illustrative purposes only and are not intended to limit the present invention in any manner. Those skilled in the art will readily recognize a variety of non-critical parameters that can be changed or modified to yield essentially the same results.

Example 1

Fifteen two-ply paper towel samples were made using a TAD process: two controls comprising no SEPF (Towel Samples 1 and 2), seven samples in which 5% of the second fibers were SEPF (Towel Samples 3-9), and six samples in which 10% of the second fibers were SEPF (Samples 10-15). Each of the samples comprised first fibers that were BEK fibers, second fibers that included NBSK fibers and softwood SEPF (except for Towel Samples 1 and 2, which had no SEPF), and third fibers that were SBSK fibers, where 25% of the fibers of the paper towel, by weight, were the third fibers. To form each of the samples, a furnish comprising the second fibers was beaten with a mechanical refiner before being combined with a furnish comprising the first and third fibers. Two wet strength resins—PAE and carboxymethyl cellulose—were added to the furnishes. For each of the plies, the combined furnishes were used to form a single-layer web that was dewatered to make the ply. The web was dewatered using vacuums and through-air drying. The TAD system included two TAD rolls and a Yankee dryer—the air used for each of the TAD rolls was heated by burning propane and the Yankee dryer was heated with steam (e.g., as described above). For all samples, two plies were produced, laminated, and embossed to make a two-ply paper towel.

The proportions of first and second fibers, refining energy, amount of wet strength resins added to the webs, and basis weight were varied. Towel properties—including caliper, bulk, air permeability, burst, wet burst, water drop absorbency, and machine direction and cross-direction stiffness, dry tensile strength, wet tensile strength, stretch, and TEA—were measured. The effect of laminating and embossing was assessed by determining the ratio of the total dry tensile strength of the paper towel to the sum of the total dry tensile strengths of the plies, which is expressed as tensile efficiency. The ratio of wet burst to total dry tensile strength was also assessed. TABLE 1 sets forth the results for Towel Samples 1 and 2, TABLE 2 sets forth the results Towel Samples 3-9, and TABLE 3 sets forth the results for Towel Samples 10-15.

TABLE 1

Properties of Control Towels

| | Towel Sample 1 | Towel Sample 2 |
|---|---|---|
| BEK (% towel fibers) | 20 | 20 |
| NBSK (% towel fibers) | 55 | 55 |
| SBSK (% towel fibers) | 25 | 25 |

TABLE 1-continued

Properties of Control Towels

| | Towel Sample 1 | Towel Sample 2 |
|---|---|---|
| Refining Energy (kWh/t) | 50.4 | 80.8 |
| Basis Weight (g/m$^2$) | 56.5 | 57.1 |
| TAD Roll 1 Propane Flow (kg/hr) | 151 | 148 |
| TAD Roll 2 Propane Flow (kg/hr) | 79 | 75.6 |
| Total TAD Propane Flow (kg/hr) | 230 | 223.6 |
| Yankee Dryer Steam Flow (kg/hr) | 1028 | 1035 |
| PAE (kg/t) | 10 | 10 |
| Carboxymethyl Cellulose (kg/t) | 2 | 2 |
| Caliper (mm) | 0.88 | 0.88 |
| Bulk (cm$^3$/g) | 15.6 | 15.4 |
| Air Permeability (cm$^3$/s-cm$^2$) | 33.6 | 30.8 |
| MD Stiffness (mN) | 2012 | 2264 |
| CD Stiffness (mN) | 1430 | 1797 |
| Handle (mN) | 6883 | 8121 |
| Dry Burst (N) | 10.4 | 11.7 |
| Wet Burst (N) | 3670 | 3994 |
| Water Drop Absorbency (s) | 4.7 | 5.0 |
| MD Dry Tensile Strength (N/m) | 571 | 659 |
| CD Dry Tensile Strength (N/m) | 399 | 444 |
| Total Dry Tensile Strength (N/m) | 970 | 1103 |
| Ply Dry Tensile Strength (N/m) | 490 | 594 |
| Tensile Efficiency (%) | 99 | 93 |
| Wet Burst: Total Dry Tensile Strength | 3.78 | 3.62 |
| MD Wet Tensile Strength (N/m) | 183 | 206 |
| CD Wet Tensile Strength (N/m) | 123 | 133 |
| MD Stretch | 17.2 | 17.1 |
| CD Stretch | 9.5 | 9.6 |
| MD TEA (J/m$^2$) | 42.8 | 49.7 |
| CD TEA (J/m$^2$) | 19.6 | 21.7 |

TABLE 2

Properties of Towels in Which 5% of the Second Fibers were SEPF

| | Towel Sample | | | | | | |
|---|---|---|---|---|---|---|---|
| | 3 | 4 | 5 | 6 | 7 | 8 | 9 |
| BEK (% towel fibers) | 20 | 20 | 35 | 20 | 20 | 20 | 20 |
| Second Fibers (% towel fibers) | 55 | 55 | 40 | 55 | 55 | 55 | 55 |
| SBSK (% towel fibers) | 25 | 25 | 25 | 25 | 25 | 25 | 25 |
| Refining Energy (kWh/t) | 49.9 | 25.2 | 50.8 | 50.2 | 49.9 | 49.0 | 0 |
| TAD Roll 1 Propane Flow (kg/hr) | 147 | 147 | 147 | 145 | 150 | 150 | 146 |
| TAD Roll 2 Propane Flow (kg/hr) | 74.2 | 73.4 | 76.7 | 75.2 | 74.6 | 71.2 | 69.7 |
| Total TAD Propane Flow (kg/hr) | 221.2 | 220.4 | 223.7 | 220.2 | 224.6 | 221.2 | 215.7 |
| Yankee Dryer Steam Flow (kg/hr) | 1021 | 995 | 1006 | 1007 | 1006 | 990 | 962 |
| Basis Weight (g/m$^2$) | 55.6 | 54.7 | 55.3 | 51.6 | 54.2 | 53.3 | 54.3 |
| PAE (kg/t) | 10 | 10 | 10 | 10 | 6 | 14 | 14 |
| Carboxymethyl Cellulose (kg/t) | 2 | 2 | 2 | 2 | 1.2 | 2.8 | 2.8 |
| Caliper (mm) | 0.91 | 0.91 | 0.90 | 0.89 | 0.87 | 0.90 | 0.89 |
| Bulk (cm$^3$/g) | 16.4 | 16.7 | 16.40 | 17.2 | 16.1 | 16.9 | 16.4 |
| Air Permeability (cm$^3$/s-cm$^2$) | 32.6 | 34.9 | 31.8 | 40.1 | 34.5 | 36.6 | 38.6 |
| MD Stiffness (mN) | 2147 | 1885 | 1934 | 1857 | 1880 | 2256 | 2006 |
| CD Stiffness (mN) | 1673 | 1456 | 1456 | 1257 | 1284 | 1499 | 1319 |
| Handle (mN) | 7639 | 6682 | 6780 | 6229 | 6329 | 7511 | 6651 |
| Dry Burst (N) | 10.8 | 9.78 | 8.71 | 9.63 | 9.08 | 10.5 | 8.19 |
| Wet Burst (N) | 4276 | 3396 | 3186 | 3168 | 2951 | 4029 | 3146 |
| Water Drop Absorbency (s) | 5.2 | 5.2 | 4.7 | 5.0 | 5.3 | 5.0 | 5.2 |
| MD Dry Tensile Strength (N/m) | 610 | 506 | 492 | 517 | 526 | 581 | 429 |
| CD Dry Tensile Strength (N/m) | 423 | 358 | 352 | 349 | 342 | 395 | 300 |
| Total Dry Tensile Strength (N/m) | 1033 | 864 | 844 | 866 | 868 | 976 | 729 |
| Ply Dry Tensile Strength (N/m) | 612 | 511 | 492 | 433 | 488 | 567 | 441 |
| Tensile Efficiency (%) | 84 | 85 | 86 | 100 | 89 | 86 | 83 |
| Wet Burst: Total Dry Tensile Strength | 4.14 | 3.93 | 3.77 | 3.66 | 3.40 | 4.13 | 4.32 |
| MD Wet Tensile Strength (N/m) | 204 | 167 | 166 | 164 | 154 | 195 | 152 |
| CD Wet Tensile Strength (N/m) | 136 | 119 | 107 | 106 | 98 | 128 | 101 |
| MD Stretch | 16.4 | 16.1 | 16.1 | 17.4 | 17.6 | 17.4 | 17.0 |
| CD Stretch | 3.6 | 9.5 | 9.4 | 9.7 | 9.3 | 10.0 | 9.9 |
| MD TEA (J/m$^2$) | 43.8 | 35.5 | 35.2 | 38.7 | 40.5 | 43.9 | 31.6 |
| CD TEA (J/m$^2$) | 20.2 | 17.4 | 16.7 | 17.1 | 16.6 | 19.9 | 15.2 |

TABLE 3

Properties of Towels in Which 10% of the Second Fibers were SEPF

| | Towel Sample | | | | | |
|---|---|---|---|---|---|---|
| | 10 | 11 | 12 | 13 | 14 | 15 |
| BEK (% towel fibers) | 20 | 20 | 20 | 20 | 45 | 20 |
| Second Fibers (% towel fibers) | 55 | 55 | 55 | 55 | 30 | 55 |
| SBSK (% towel fibers) | 25 | 25 | 25 | 25 | 25 | 25 |
| Refining Energy (kWh/t) | 48.7 | 49.0 | 50.2 | 50.5 | 50.4 | 50.0 |
| TAD Roll 1 Propane Flow (kg/hr) | 147 | 151 | 147 | 143 | 147 | 143 |
| TAD Roll 2 Propane Flow (kg/hr) | 74.7 | 77.8 | 77.7 | 70 | 73.5 | 71.6 |
| Total TAD Propane Flow (kg/hr) | 221.7 | 228.8 | 224.7 | 213 | 220.5 | 214.6 |
| Yankee Dryer Steam Flow (kg/hr) | 1030 | 1031 | 1030 | 981 | 1002 | 984 |
| Basis Weight (g/m$^2$) | 55.1 | 55.2 | 55.8 | 51.0 | 55.3 | 50.3 |
| PAE (kg/t) | 10 | 10 | 14 | 14 | 14 | 10 |
| Carboxymethyl Cellulose (kg/t) | 2 | 2 | 2.8 | 2.8 | 2.8 | 2 |
| Caliper (mm) | 0.88 | 0.90 | 0.90 | 0.89 | 0.91 | 0.85 |
| Bulk (cm$^3$/g) | 15.9 | 16.4 | 16.1 | 17.2 | 16.4 | 16.9 |
| Air Permeability (cm$^3$/s-cm$^2$) | 31.4 | 30.6 | 30.3 | 40.3 | 30.9 | 41.1 |
| MD Stiffness (mN) | 2044 | 2435 | 2628 | 2359 | 2363 | 2279 |
| CD Stiffness (mN) | 1503 | 1809 | 1766 | 1522 | 1548 | 1633 |
| Handle (mN) | 7094 | 8489 | 8787 | 7763 | 7809 | 7825 |
| Dry Burst (N) | 10.1 | 10.5 | 11.3 | 9.83 | 8.28 | 9.76 |
| Wet Burst (N) | 3958 | 3780 | 4692 | 4342 | 2860 | 3596 |
| Water Drop Absorbency (s) | 5.0 | 5.20 | 5.2 | 5.3 | 5.2 | 5.20 |
| MD Dry Tensile Strength (N/m) | 582 | 574 | 637 | 546 | 435 | 524 |
| CD Dry Tensile Strength (N/m) | 399 | 415 | 442 | 392 | 322 | 362 |
| Total Dry Tensile Strength (N/m) | 981 | 989 | 1079 | 938 | 757 | 886 |
| Ply Dry Tensile Strength (N/m) | 548 | 600 | 632 | 590 | 442 | 519 |
| Tensile Efficiency (%) | 90 | 82 | 85 | 79 | 86 | 85 |
| Wet Burst: Total Dry Tensile Strength | 4.03 | 3.82 | 4.35 | 4.63 | 3.78 | 4.06 |
| MD Wet Tensile Strength (N/m) | 192 | 211 | 237 | 211 | 160 | 173 |
| CD Wet Tensile Strength (N/m) | 130 | 135 | 147 | 137 | 109 | 116 |
| MD Stretch | 17.5 | 17.4 | 17.7 | 17.4 | 16.8 | 17.3 |
| CD Stretch | 9.6 | 9.6 | 9.7 | 10.0 | 9 | 9.9 |
| MD TEA (J/m$^2$) | 44.4 | 43.1 | 49.1 | 41.0 | 32.8 | 39.1 |
| CD TEA (J/m$^2$) | 19.4 | 20.0 | 21.5 | 19.7 | 14.5 | 18.1 |

During production, the second fibers were refined using more energy for the second control (Towel Sample 2) than for the first control (Towel Sample 1). A similar level of refining was used for all SEPF-containing samples (except for Towel Samples 4 and 9) as was used for Towel Sample 1.

The towel samples that included SEPF were, in general, stronger than the controls, all else being equal. For example, Towel Samples 3 and 10—which except for the inclusion of SEPF were the same as Towel Sample 1—had wet bursts that were 7% and 8% larger, respectively, than the wet burst of Towel Sample 1. Towel Samples 3 and 10 also had a lower tensile efficiency, at 84% and 90%, respectively than Towel Sample 1 (e.g., indicating that laminating and embossing reduced dry tensile strength in those towels more than the control), and exhibited a higher ratio of wet burst to total dry tensile strength.

Compared to Towel Sample 1, less refining energy was used to refine the second fibers of Towel Sample 4, Towel Sample 5 had a lower proportion of second fibers, Towel Sample 6 had a lower basis weight, and Towel Sample 7 used less wet strength resin. These towel samples were not as strong as Towel Sample 1, as reflected by their lower wet bursts, and only some (e.g., Towel Samples 6 and 7) exhibited improved softness (e.g., lower handle). And, of these towels, only Towel Sample 4 had a higher ratio of wet burst to total dry tensile strength.

More wet strength resin was used in Towel Samples 8, 9, and 12-14, compared to Towel Sample 1. Additionally, compared to Towel Sample 1, the second fibers of Towel Sample 9 were not refined, Towel Sample 13 had a lower basis weight, and Towel Sample 14 had a lower proportion of second fibers. Increasing the amount of wet strength resin tended to yield higher ratios of wet burst to total dry tensile ratio, as reflected by Towel Samples 8 and 12. Towel Sample 9 was softer and had a higher ratio of wet burst to total dry tensile strength than Towel Sample 1 but also had lower strength, and Towel Sample 14 was both weaker and less soft than while having a similar ratio of wet burst to total dry tensile strength as Towel Sample 1. Towel Sample 13—which incorporated more wet strength resin and had a lower basis weight than Towel Sample 1—had a higher wet burst than Towel Sample 1 and the highest ratio of wet burst to total dry tensile strength of the towels, and while it had a higher handle than Towel Sample 1, it had a lower handle than Towel Sample 12.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the products, systems, and methods are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method of making a paper product, the method comprising:

laminating and/or embossing one or more sheets such that a total dry tensile strength of the paper product is less than or equal to 90% of the sum of the total dry tensile strength(s) of the sheet(s);

wherein each of the sheet(s) comprises one or more furnishes each comprising:

a plurality of first fibers that are hardwood fibers; and a plurality of second fibers including softwood fibers and surface enhanced pulp fibers (SEPF) having a length weighted average fiber length that is at least 0.20 millimeters (mm), wherein the SEPF are made by refining a pulp feed, the refining including for each of one or more mechanical refiners:

introducing the pulp feed between two refining elements of the refiner, each of the refining elements comprising:

a plurality of bars, each protruding from a surface of the refining element and having a width that is less than or equal to 1.3 mm; and a plurality of grooves defined by the bars, each having a width that is less than or equal to 2.5 mm; and rotating at least one of the refining elements;

wherein refining the pulp feed is performed such that the refiner(s) consume at least 300 kilowatt-hours (kWh) per ton of fiber in the pulp feed; and introducing one or more wet strength resins to the one or more furnishes such that, per ton of fiber in the one or more furnishes, at least 13 kilograms (kg) of a first wet strength resin and/or at least 2.5 kg of a second wet strength resin are introduced, wherein the paper product has a basis weight of greater than 51.6 gsm; and wherein by weight:

at least 90% of the second fibers are the softwood fibers; and between 1% and 10% of the second fibers are the SEPF.

2. The method of claim 1, wherein:

the one or more sheets comprise two or more sheets; and the method comprises laminating the sheets.

3. The method of claim 1, comprising embossing the sheet(s).

4. A method of making a paper product, the method comprising:

making one or more sheets at least by, for each of the sheet(s):

forming a web from one or more furnishes that comprise fibers dispersed in water, the fibers of the furnish(es) comprising:

a plurality of first fibers that are hardwood fibers; and a plurality of second fibers including softwood fibers and surface enhanced pulp fibers (SEPF) having a length weighted average fiber length that is at least 0.20 millimeters (mm), wherein the SEPF are made by refining a pulp feed, the refining including for each of one or more mechanical refiners:

introducing the pulp feed between two refining elements of the refiner, each of the refining elements comprising:

a plurality of bars, each protruding from a surface of the refining element and having a width that is less than or equal to 1.3 mm; and a plurality of grooves defined by the bars, each having a width that is less than or equal to 2.5 mm; and rotating at least one of the refining elements;

wherein refining the pulp feed is performed such that the refiner(s) consume at least 300 kilowatt-hours (kWh) per ton of fiber in the pulp feed;

introducing one or more wet strength resins to the one or more furnishes such that, per ton of fiber in the one or more furnishes, at least 13 kilograms (kg) of a first wet strength resin and/or at least 2.5 kg of a second wet strength resin are introduced; and at least partially dewatering the web to form the sheet; and laminating and/or embossing the sheet(s) such that a total dry tensile strength of the paper product is less than or equal to 90% of the sum of the total dry tensile strength(s) of the sheet(s), wherein the paper product has a basis weight of greater than 51.6 gsm; and wherein by weight:

at least 90% of the second fibers are the softwood fibers; and between 1% and 10% of the second fibers are the SEPF.

5. The method of claim 4, wherein the first wet strength resin comprises polyamide-epichlorohydrin and the second wet strength resin comprises carboxymethyl cellulose.

6. The method of claim 4, wherein by weight:

between 10% and 35% of the fibers of the furnish(es) are the first fibers; and at least 40% of the fibers of the furnish(es) are the second fibers.

7. A paper product comprising:

a first plurality of first fibers that are hardwood fibers;

a second plurality of second fibers including softwood fibers and surface enhanced pulp fibers (SEPF), wherein the SEPF are made by refining a pulp feed, the refining including for each of one or more mechanical refiners:

introducing the pulp feed between two refining elements of the refiner, each of the refining elements comprising:

a plurality of bars, each protruding from a surface of the refining element and having a width that is less than or equal to 1.3 millimeters (mm); and a plurality of grooves defined by the bars, each having a width that is less than or equal to 2.5 mm; and rotating at least one of the refining elements;

wherein refining the pulp feed is performed such that the refiner(s) consume at least 300 kilowatt-hours (kWh) per ton of fiber in the pulp feed;

one or more plies comprising the first and second fibers; and one or more wet strength resins comprising, per ton of fiber in the paper product, at least 13 kilograms (kg) of polyamide-epichlorohydrin and/or at least 2.5 kg of carboxymethyl cellulose;

wherein:

the one or more plies comprise two or more plies that are coupled together; and/or the paper product is embossed; and by weight:

at least 90% of the second fibers are the softwood fibers; and between 1% and 10% of the second fibers are the SEPF.

8. The paper product of claim 7, wherein the one or more plies comprise two or more plies that are coupled together.

9. The paper product of claim 7, wherein the paper product is embossed.

10. The paper product of claim 7, wherein by weight between 10% and 35% of the fibers of the paper product are the first fibers; and at least 40% of the fibers of the paper product are the second fibers.

11. The paper product of claim 7, wherein the paper product has a basis weight that is less than or equal to 26 gsm per ply.

12. The paper product of claim 7, wherein the paper product is a paper towel.

* * * * *